United States Patent
Lussier

(10) Patent No.: US 10,202,866 B2
(45) Date of Patent: Feb. 12, 2019

(54) GROUND HANDLING SYSTEM FOR A COMPOSITE FAN CASE AND A METHOD OF USING THE SAME

(71) Applicant: United Technologies Corporation, Farmington, CT (US)

(72) Inventor: Darin S. Lussier, Guilford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 371 days.

(21) Appl. No.: 14/958,548

(22) Filed: Dec. 3, 2015

(65) Prior Publication Data

US 2016/0160678 A1 Jun. 9, 2016

Related U.S. Application Data

(60) Provisional application No. 62/087,606, filed on Dec. 4, 2014.

(51) Int. Cl.
| | | |
|---|---|---|
| *F01D 25/24* | (2006.01) | |
| *F01D 21/04* | (2006.01) | |
| *F01D 25/28* | (2006.01) | |

(52) U.S. Cl.
CPC ............ *F01D 21/04* (2013.01); *F01D 25/24* (2013.01); *F01D 25/28* (2013.01); *F05D 2300/603* (2013.01); *Y02T 50/672* (2013.01)

(58) Field of Classification Search
CPC ........ F01D 21/04; F01D 25/24; F01D 25/243; F01D 25/28; F02C 7/20; F02C 7/32; F05D 2300/603
See application file for complete search history.

(56) References Cited

U.S. PATENT DOCUMENTS

| | | | |
|---|---|---|---|
| 8,596,972 B2 | 12/2013 | Moon | |
| 8,672,609 B2 | 3/2014 | Lussier et al. | |
| 9,714,585 B2* | 7/2017 | Morey | B62B 3/02 |
| 2012/0099975 A1* | 4/2012 | Robertson, Jr. | B64D 27/26 |
| | | | 415/182.1 |
| 2012/0275913 A1* | 11/2012 | Robertson, Jr. | F01D 25/243 |
| | | | 415/200 |
| 2013/0336773 A1 | 12/2013 | Robertson et al. | |

FOREIGN PATENT DOCUMENTS

| | | |
|---|---|---|
| EP | 2518282 A2 | 10/2012 |
| JP | 2011256829 A | 12/2011 |

OTHER PUBLICATIONS

English Abstract for JP2011256829A—Dec. 22, 2011; 2 pgs.
European Search Report for Application No. 15197997.8-1610; dated May 11, 2016; 6 pgs.

* cited by examiner

*Primary Examiner* — Christopher Verdier
*Assistant Examiner* — Maxime Adjagbe
(74) *Attorney, Agent, or Firm* — Cantor Colburn LLP

(57) ABSTRACT

The present disclosure relates generally to a system for handling a gas turbine engine fan case. The system includes a composite fan containment case including a case outer surface, a case inner surface, and at least one main case aperture extending from the case outer surface through the case inner surface, and at least one shear puck, the at least one shear puck including a shear puck protrusion; wherein the shear puck protrusion of each of the at least one shear pucks is disposed within a respective one of each of the at least one main case apertures.

15 Claims, 6 Drawing Sheets

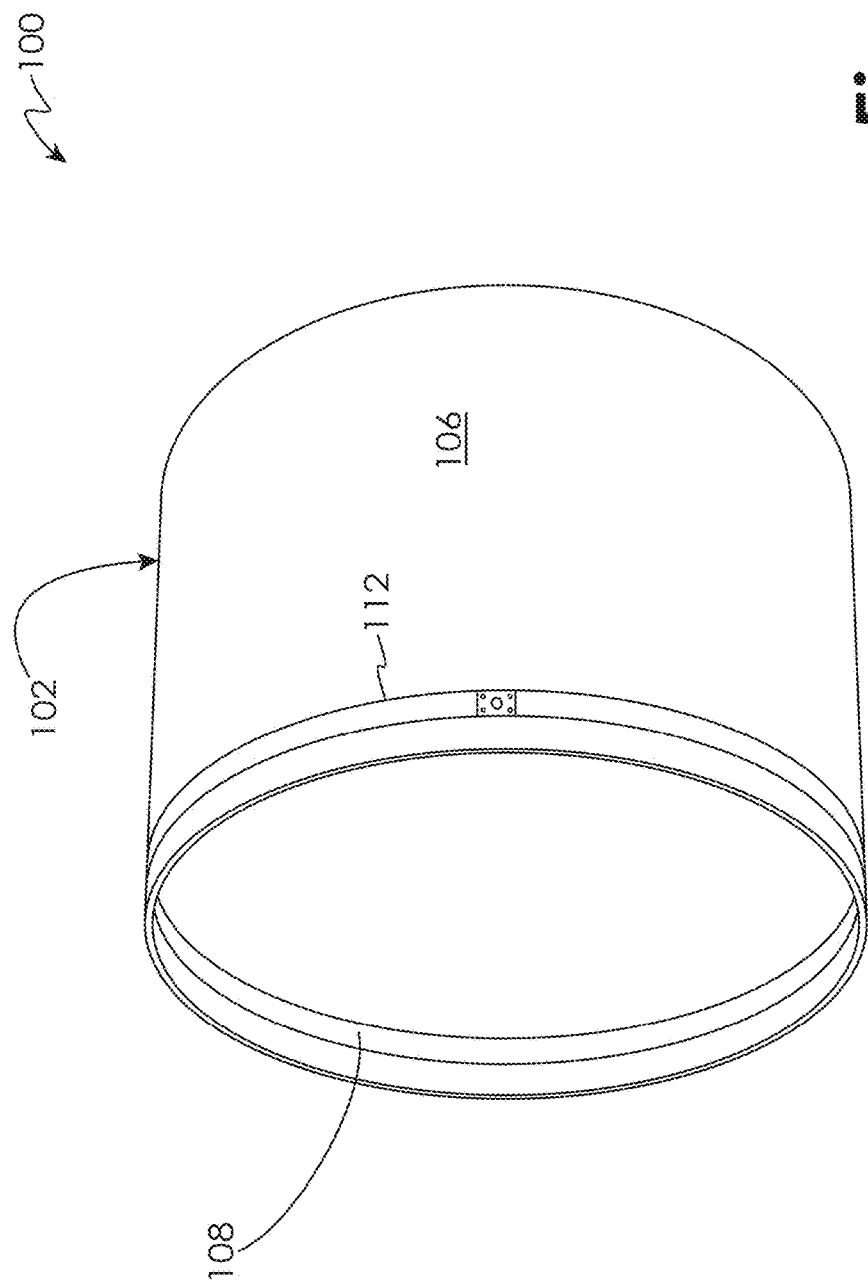

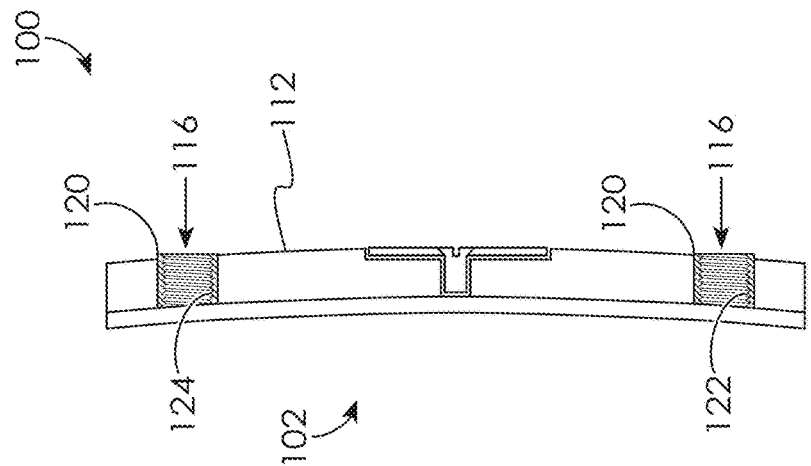
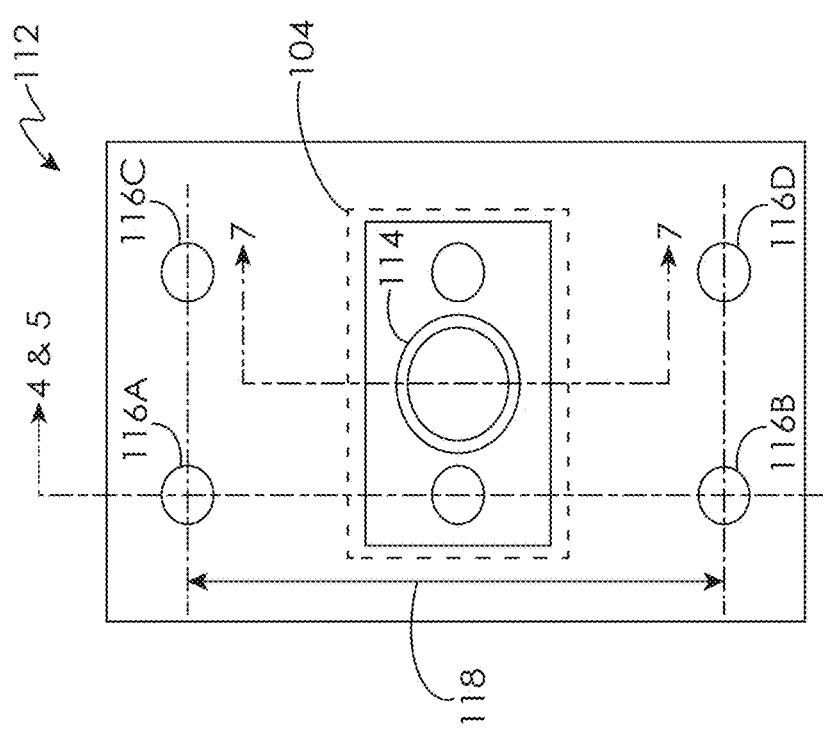

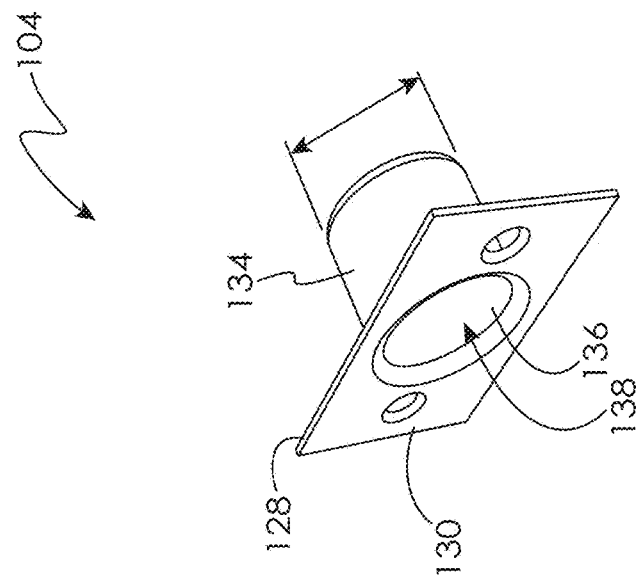
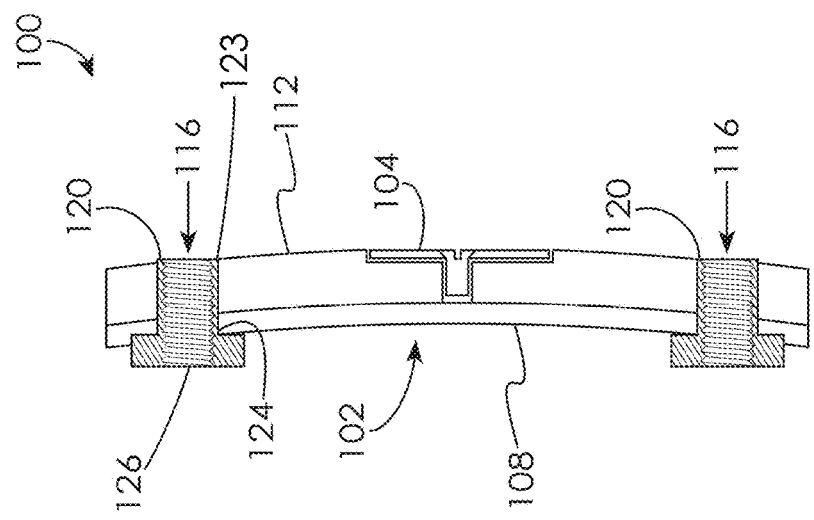

GROUND HANDLING SYSTEM FOR A COMPOSITE FAN CASE AND A METHOD OF USING THE SAME

CROSS REFERENCE TO RELATED APPLICATIONS

This application claims the benefit of U.S. Provisional Patent Application Ser. No. 62/087,606, filed Dec. 4, 2014, the entire contents of which are incorporated herein by reference thereto.

TECHNICAL FIELD OF THE DISCLOSED EMBODIMENTS

The present disclosure is generally related to gas turbine engine fan cases, in particular to a ground handling system for a composite fan case and a method of using the same.

BACKGROUND OF THE DISCLOSED EMBODIMENTS

To reduce the overall weight of an aircraft, lighter weight solutions to engine components are becoming necessary. As a result, composite materials have recently been used to aid in meeting desired weight targets. Generally, fan cases are composed of composite materials, and as a result, the addition of engine support provisions for ground and shipping have added complexity and increased costs.

Improvements in ground handling and shipping composite fan cases are therefore needed in the art.

SUMMARY OF THE DISCLOSED EMBODIMENTS

A system for handling a gas turbine engine fan case is provided. The system includes a composite fan containment case. The composite fan containment case includes a case outer surface, a case inner surface, and at least one main case aperture extending from the case outer surface through the case inner surface. The system further includes at least one shear puck. The at least one shear puck includes a shear puck protrusion disposed within each of the at least one main case apertures.

In one embodiment, the system further includes at least one support structure affixed to the case outer surface. The at least one support structure includes a main support structure aperture substantially aligned with each of the at least one main apertures. In one embodiment, the at least one support structure further includes a plurality of support apertures located adjacent to the main support aperture. The at least one support structure further includes a fastening device disposed within each of the plurality of support apertures. In one embodiment, the fastening device includes a fastening device inner surface, wherein the fastening device inner surface includes a plurality of threads disposed thereon. In another embodiment, the fastening device includes a fastening device proximal end, a fastening device distal end, and a flange extending from the fastening device distal end. In one embodiment, the fastening device includes a threaded flange bushing.

In one embodiment, the shear puck includes a mounting plate, including a first surface, a second surface, the shear puck protrusion extending from the second surface, and a shear puck aperture extending from the first surface into the shear puck protrusion to form a cavity therein. In one embodiment, the shear puck protrusion includes a width dimension greater than or equal to approximately one inch (approximately 2.54 cm).

A method of handling a composite fan containment case is provided. The method includes the step of inserting at least one ground support device within a case handling system. In one embodiment, the ground support device includes a ground support device first surface including a main first surface protrusion and a plurality of auxiliary protrusions disposed thereon, and a ground support device second surface including main second surface protrusion disposed thereon. In one embodiment, inserting the first ground support device within the case handling system includes inserting the main first surface protrusion into the cavity.

The method further includes the step of transporting the case handling system to a desired location. In one embodiment, transporting the case handling system to a desired location includes engaging the main second surface protrusion with a transporting device, lifting the case handling system via the transporting device, and moving the case handling system to the desired location via the transporting device.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 2 is a perspective view of a system for handling a gas turbine engine fan case;

FIG. 3 is an enlarged view of a support device according to an embodiment;

FIG. 4 is a cross-sectional view of the system for handling a gas turbine engine according to the embodiment of FIG. 3;

FIG. 5 is a cross-sectional view of the system for handling a gas turbine engine according to the another embodiment of FIG. 3;

FIG. 6 is a side view and perspective view of an embodiment of a shear puck;

DETAILED DESCRIPTION OF THE DISCLOSED EMBODIMENTS

Figure 1:
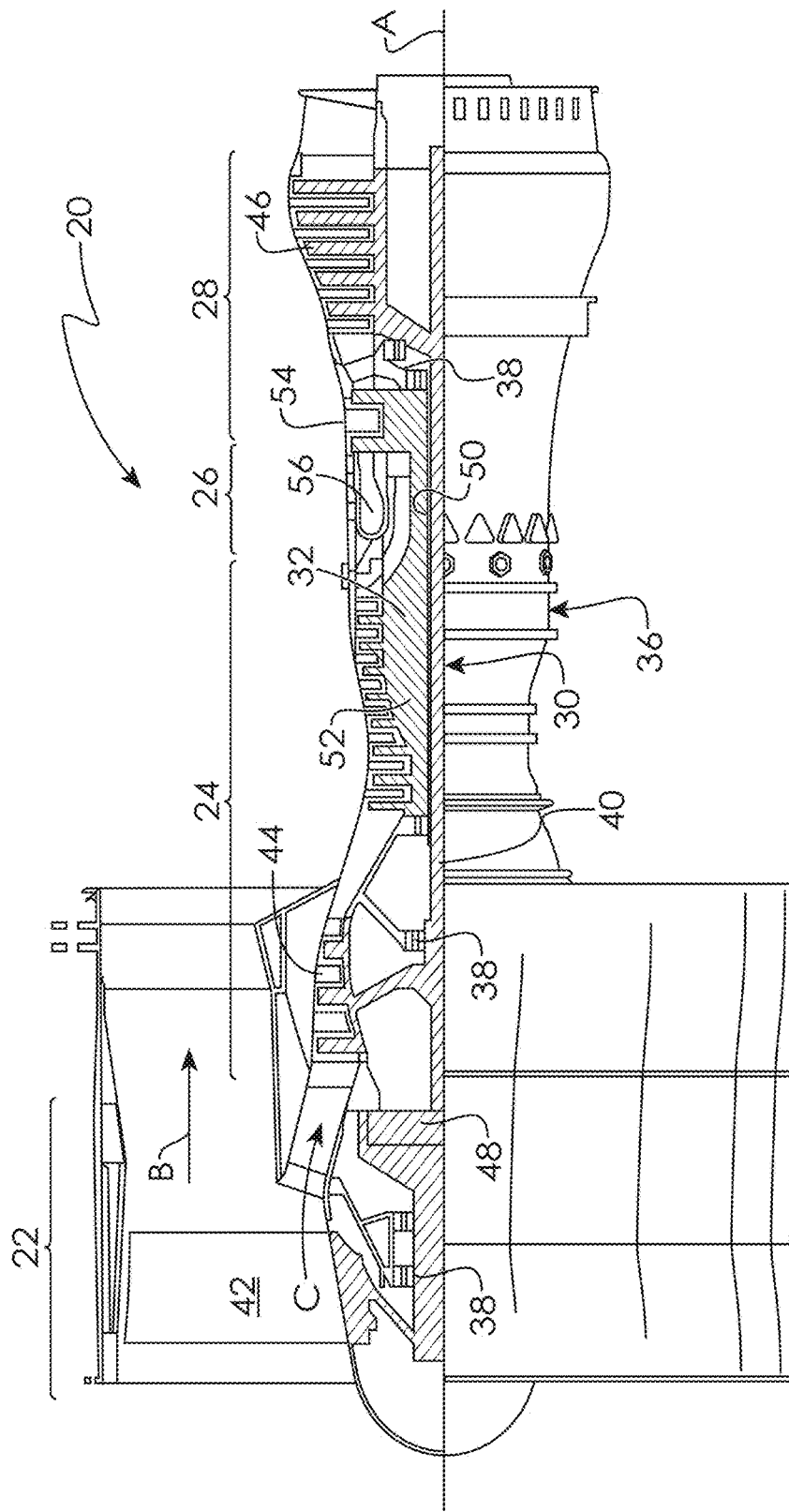
FIG. 1 is a sectional view of one example of a gas turbine engine in which the presently disclosed embodiments may be used.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows a gas turbine engine 20, such as a gas turbine used for power generation or propulsion, circumferentially disposed about an engine centerline, or axial centerline axis A. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second (350.5 m/sec).

FIG. 2 illustrates a system for handling a gas turbine engine fan case, generally indicated at 100. The system 100 includes a composite fan containment case 102. The composite fan containment case 102 includes a case outer surface 106, a case inner surface 108, and at least one main case aperture 110 extending from the case outer surface 106 through the case inner surface 108. The system 100 further includes at least one shear puck 104. The at least one shear puck 104 includes a shear puck protrusion 134 (see FIG. 6), wherein the shear puck protrusion 134 is disposed within each of the at least one main case apertures 110. The at least one main case aperture 110 is configured to support a percentage of the vertical shear load from the weight of the gas turbine engine 20 in addition to a factor of safety. It will be appreciated that the at least one main aperture 110 may be located in one embodiment at a position representative of a 3:00 and a 9:00 position to optimize stability when handling the composite fan containment case 102; however, the at least one main aperture 110 may be disposed at any location on the composite fan containment case 102.

In one embodiment, the system 100 further includes at least one support structure 112. The at least one support structure 112 is affixed to the case outer surface 106. In one embodiment, the at least one support structure 112 may be composed of aluminum while in other embodiments, the at least one support structure may be composed of any suitable material. In one embodiment, the at least one support structure 112 may comprise a continuous annular ring that encircles the composite fan containment case 102. In another embodiment, the at least one support structure 112 may comprise a plurality of support structures positioned to provide additional support for mounting the composite fan containment case 102 or for handling the composite fan containment case 102 on the ground. The at least one support structure 112 includes a main support structure aperture 114. The main support structure aperture 114 is substantially aligned with one of the at least one main apertures 110 and receives the shear puck 104.

In one embodiment, the at least one support structure 112 further includes a plurality of support structure apertures 116. The plurality of support structure apertures 116 are located adjacent to the main support aperture 114. The plurality of support structure apertures 116 are configured to support the radial load and moments resulting from the load being applied to the ground handling attachment post 150 (see FIG. 7) at a radial distance from the case outer surface 106. In the example shown in FIG. 3, a first support structure aperture 116A and a second support structure aperture 116B are positioned forward of the main support structure aperture 114. A third support structure aperture 116C and a fourth support structure aperture 116D are positioned aft of the main support structure aperture 114. The first support structure aperture 116A and the second support structure aperture 116B are separated by a length dimension 118. For example, the length dimension 118 may be greater than or equal to approximately 5 inches (approximately 12.7 cm.) to name one example. It will be appreciated that the length dimension 118 may be less than approximately 5 inches (approximately 12.7 cm.) The third support structure aperture 118C and a fourth support structure aperture 116D are also separated by the length dimension 118. It will be appreciated that any number of support structure apertures 116 may be used within the system 100.

In some embodiments, the at least one support structure 112 further includes a fastening device 120, as shown in FIG. 4, disposed within each of the plurality of support apertures 116. The fastening device 120 may be secured within each of the plurality of support structure apertures 116 by any suitable method, such as counter-boring, bonding or press fitting to name a few non-limiting examples. The fastening device 120 is configured to engage a ground handling attachment post 150 (see FIG. 7) used for handling the system 100. In one embodiment, the fastening device 120 includes a fastening device inner surface 122, wherein the fastening device inner surface 122 includes a plurality of threads 124 disposed thereon.

In another embodiment, as shown in FIG. 5, the fastening device 120 includes a fastening device proximal end 123, a fastening device distal end 124, and a flange 126 extending from the fastening device distal end 124. In one embodiment, the fastening device 120 includes a threaded flange bushing. For example, in an embodiment where the at least one support structure 112 includes a plurality of support structures 112, the fastening device 120 penetrates the case outer surface 106 and the case inner surface 108 such that the flange 126 is in contact with the case inner surface 108.

Figure 7:
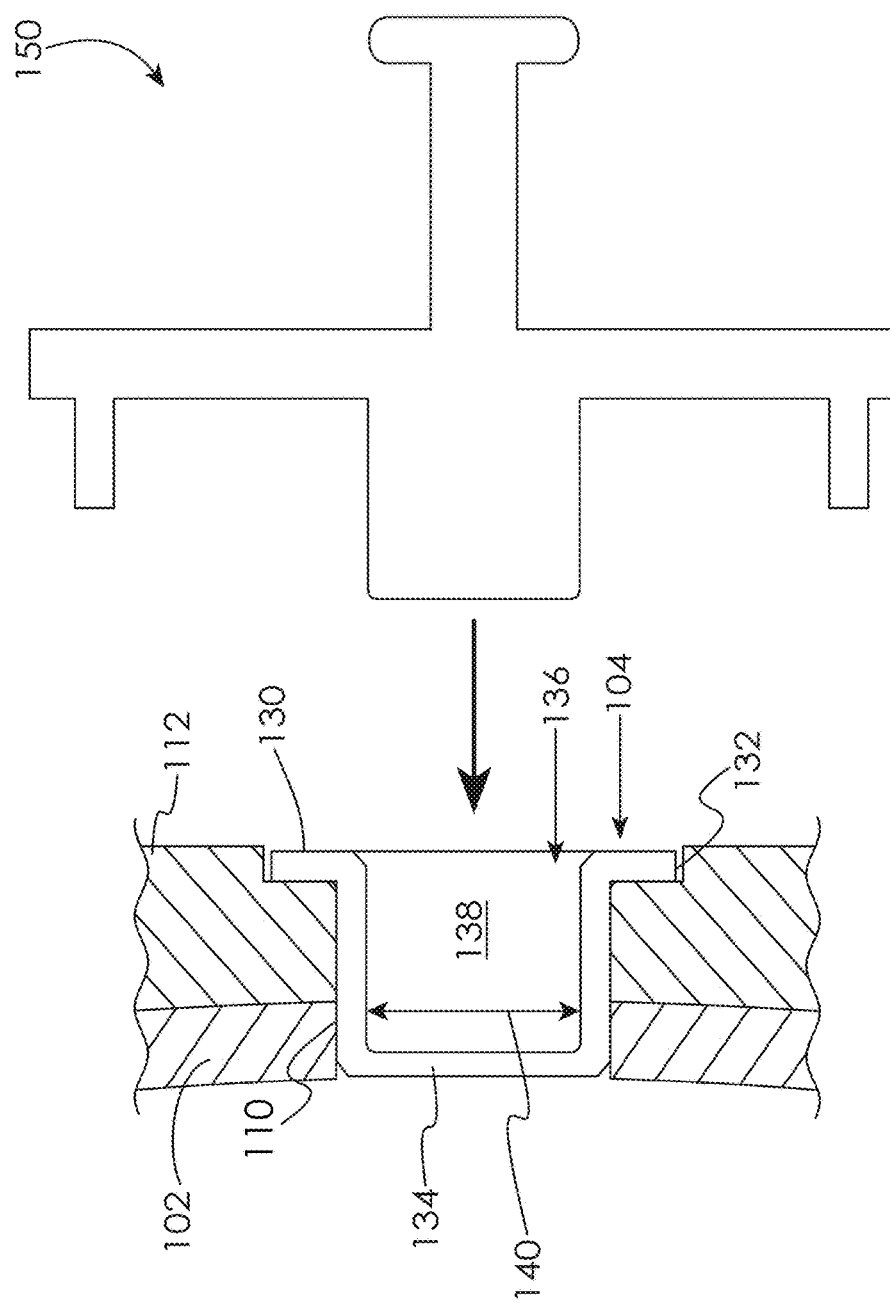
FIG. 7 is a cross-sectional view of the shear puck according to the embodiment of FIG. 6.

In one embodiment, as shown in FIG. 6, the shear puck 104 includes a mounting plate 128, including a first surface 130, a second surface 132, the shear puck protrusion 134 extending from the second surface 132, and a shear puck aperture 136 extending from the first surface 130 into the shear puck protrusion 134 to form a cavity 138 therein. The shear puck protrusion 134 is configured to engage the at least one main case aperture 110, as shown in FIG. 7, to allow the shear puck 104 to react vertical lifting loads into the composite fan containment case 102. The second surface 132 is placed in contact with the at least one support structure 112 to allow the mounting plate 126 to be affixed thereon. In one embodiment, the shear puck protrusion 134 includes a width dimension 140 greater than or equal to approximately one inch (approximately 2.54 cm). It will be appreciated that the width dimension 140 may be less than approximately one inch (approximately 2.54 cm.). It will also be appreciated that the width dimension 140 is based at least in part on the energized load and the mass of the composite fan containment case 102.

Figure 8:
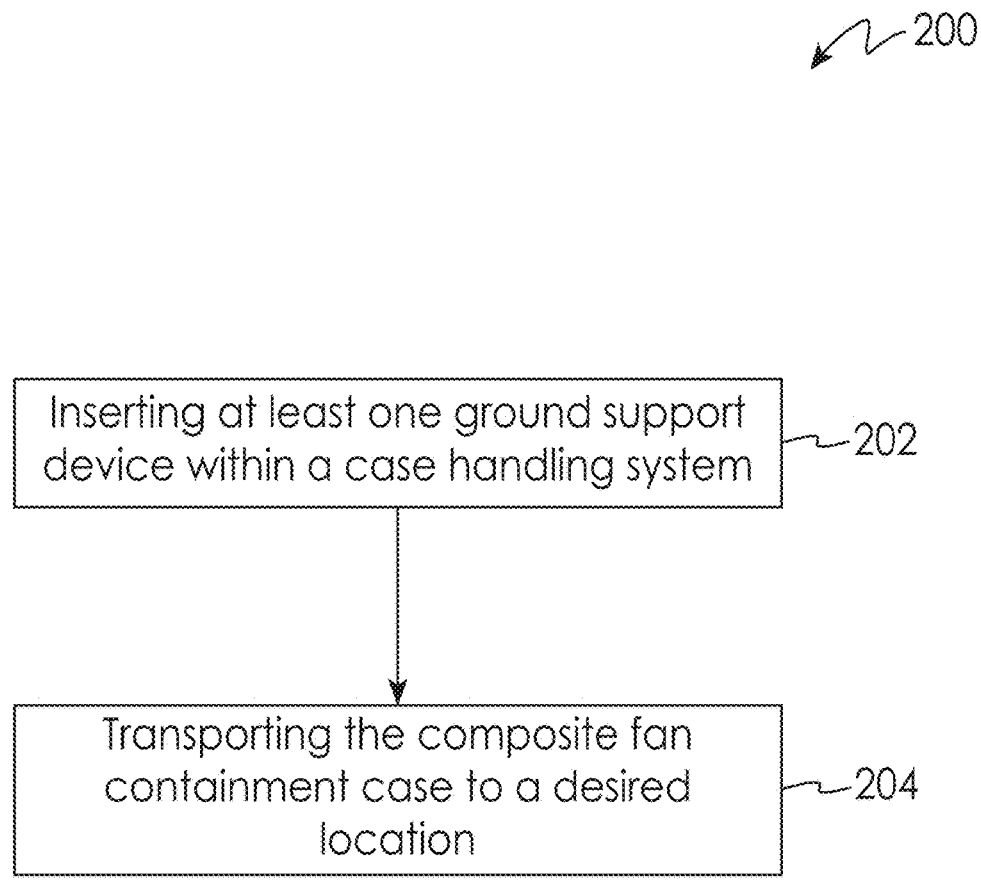
FIG. 8 is a schematic flow diagram of an embodiment of a method of handling a composite fan containment case.

FIG. 8 illustrates a method, generally indicated at 200, of handling a composite fan containment case. The method 200 includes the step 202 of inserting at least one ground support device (not shown) within the case handling system 100. In one embodiment, the ground support device includes a ground support device first surface including a main first surface protrusion and a plurality of auxiliary protrusions disposed thereon, and a ground support device second surface including main second surface protrusion disposed thereon. It will be appreciated that the ground support device first surface may include a plurality of auxiliary protrusions disposed thereon, wherein the auxiliary protrusions are adjacent to the main first surface protrusion.

In one embodiment, inserting the first ground support device within the case handling system 100 includes inserting the main first surface protrusion into the cavity 138. It will be appreciated that each of the plurality of auxiliary protrusions may be aligned such that each may engage each of the support apertures 116. It will also be appreciated that any suitable ground support device may be used in the method.

The method 200 further includes the step 204 of transporting the case handling system 100 to a desired location. In one embodiment, transporting the case handling system 100 to a desired location includes engaging the main second surface protrusion with a transporting device, lifting the case handling system 100 via the transporting device, and moving the case handling system 100 to the desired location via the transporting device.

It will be appreciated that the system 100 for handling a gas turbine engine fan case includes a shear puck 104 engaged with a composite fan containment case 102 to efficiently load the composite fan containment case 102; thus, allowing for a more cost effective and simple tool to maneuver the composite fan containment case 102 during ground handling and shipping. It will also be appreciated that the system 100 may be used for supporting both the composite fan containment case 102 as well as supporting a percent of the weight of the gas turbine engine 20 in addition to a safety factor.

While the disclosure has been illustrated and described in detail in the drawings and foregoing description, the same is to be considered as illustrative and not restrictive in character, it being understood that only certain embodiments have been shown and described and that all changes and modifications that come within the scope of the disclosure are desired to be protected.

What is claimed is:

1. A system for handling a gas turbine engine fan case comprising:
    a composite fan containment case, the composite fan containment case including a case outer surface, a case inner surface, and at least one main case aperture extending from the case outer surface through the case inner surface; and
    at least one shear puck, the at least one shear puck including a shear puck protrusion extending from a mounting plate of the at least one shear puck, the mounting plate being wider than the shear puck protrusion, and wherein the at least one shear puck is formed as a single piece;
    wherein the shear puck protrusion of the at least one shear puck is inserted into a respective one of the at least one main case aperture from the case outer surface, and wherein the shear puck protrusion engages the at least one main case aperture when inserted therein to allow the shear puck to react vertical lifting loads into the composite fan containment case.

2. The system of claim 1, further comprising at least one support structure affixed to the case outer surface, the at least one support structure comprising a main support structure aperture substantially aligned with the at least one main case aperture.

3. The system of claim 2, wherein the mounting plate has a first surface and a second surface and the shear puck protrusion extends from the second surface; and wherein a shear puck aperture extends from the first surface into the shear puck protrusion to form a cavity therein; and
wherein the mounting plate is affixed to the at least one support structure.

4. The system of claim 2, wherein the at least one support structure further comprises:
a plurality of support apertures, wherein the plurality of support apertures are located adjacent to the main support structure aperture; and
a fastening device disposed within each of the plurality of support apertures.

5. The system of claim 4, wherein the fastening device comprises a fastening device inner surface, wherein the fastening device inner surface includes a plurality of threads disposed thereon.

6. The system of claim 4, wherein the fastening device comprises a fastening device proximal end, a fastening device distal end, and a flange extending from the fastening device distal end.

7. The system of claim 6, wherein the fastening device comprises a threaded flange bushing.

8. The system of claim 6, wherein the flange is in contact with the case inner surface.

9. The system of claim 1, wherein the shear puck protrusion includes a width dimension greater than or equal to approximately 1 inch.

10. A method of handling a composite fan containment case, the method comprising the steps of:
(a) inserting at least one ground support device within a case handling system; and
(b) transporting the case handling system to a desired location;
wherein the case handling system comprises:
the composite fan containment case, the composite fan containment case including a case outer surface, a case inner surface, and at least one main case aperture extending from the case outer surface through the case inner surface; and
at least one shear puck, the at least one shear puck including a shear puck protrusion extending from a mounting plate of the at least one shear puck, the mounting plate being wider than the shear puck protrusion, and wherein the at least one shear puck is formed as a single piece;
wherein the shear puck protrusion of the at least one shear puck is inserted into a respective one of the at least one main case aperture from the case outer surface, and wherein the shear puck protrusion engages the at least one main case aperture when inserted therein to allow the shear puck to react vertical lifting loads into the composite fan containment case.

11. The method of claim 10, wherein the case handling system further comprises:
at least one support structure affixed to the case outer surface, each of the at least one support structures comprising a main support structure aperture substantially aligned with a respective one of each of the at least one main case apertures.

12. The method of claim 11, wherein the mounting plate has a first surface and a second surface and the shear puck protrusion extends from the second surface; and wherein a shear puck aperture extends from the first surface into the shear puck protrusion to form a cavity therein; and
wherein the mounting plate is affixed to the at least one support structure.

13. The method of claim 12, wherein the at least one ground support device comprises:
a ground support device first surface including a main first surface protrusion disposed thereon; and
a ground support device second surface including a main second surface protrusion disposed thereon.

14. The method of claim 13, wherein inserting the first ground support device within the case handling system comprises inserting the main first surface protrusion into the cavity.

15. The method of claim 13, wherein transporting the case handling system to a desired location comprises:
engaging the main second surface protrusion with a transporting device;
lifting the case handling system via the transporting device;
and moving the case handling system case to the desired location via the transporting device.

* * * * *